United States Patent Office 3,304,192
Patented Feb. 14, 1967

3,304,192
IMPROVED COAL-TAR PITCH COMPOSITION
Richard C. Barrett, New Milford, N.J., assignor to Allied Chemical Corporation, New York, N.Y., a corporation of New York
No Drawing. Filed May 21, 1963, Ser. No. 282,142
5 Claims. (Cl. 106—280)

This invention relates to improved coal-tar pitches and more particularly to coal-tar pitches adapted for application to surfaces either in fluid form at elevated temperatures above their softening points or dissolved in an aromatic solvent.

Coal-tar pitches, i.e. the solid or semi-solid residues remaining from the distillation of coal tars, have been used for many years as waterproofing agents and protective coatings in many applications where their excellent waterproofing characteristics make them valuable. Such uses include built-up roofings, foundation wall coatings, pipeline enamels and many others, usually applied in hot melt form.

Such coal-tar pitches have well defined characteristics and properties dictated generally by the end uses which they are designed to serve. Normal coal-tar pitches usually have ring and ball softening points of at least about 40° C., and this value may range up to 135° C. or even much higher in special cases.

Coal-tar pitches adapted for roofing, damp-proofing and waterproofing purposes are defined and characterized in ASTM Standard Specification D–450. These pitches fall into two types, Type A and Type B.

Type A designates a coal-tar pitch suitable for use as a mopping coat in the construction of built-up roofs, and for use as a mopping coat in dampproofing or as a plying cement in the construction of a membrane system of waterproofing above ground level, when not exposed to temperatures exceeding 125° F. (52° C.)

Type B designates a coal-tar pitch for use as a mopping coat in dampproofing or as a plying cement in the construction of a membrane system of waterproofing below ground level under uniformly moderate temperature conditions both during the process of installation and during service.

These normal coal-tar pitches have the following properties as set forth in Table I of ASTM Specification D–450.

TABLE I.—D-450 REQUIREMENTS FOR COAL-TAR PITCH TYPES A AND B

|  | Min. | Max. |
|---|---|---|
| Water, percent | | 0 |
| Specific gravity, 25/25 C. (77/77 F.) | 1.22 | 1.34 |
| Softening point (cube-in-water method): | | |
|     Type A | 140 F. (60 C.) | 155 F. (68 C.) |
|     Type B | 120 F. (49 C.) | 140 F. (60 C.) |
| Flash point (Cleveland open cup) | 248 F. (120 C.) | |
| Distillation test: | | |
|     Total distillate by weight 32 to 572 F. (0 to 300 C.), percent | | 10 |
|     Residue by weight, percent | 90 | |
| Specific gravity, 100/60 F. (38/15.5 C.) of total distillate to 572 F. (300 C.) | 1.03 | |
| Softening point (cube-in-water method) of residue from distillation to 572 F. (300 C.) | | 175 F. (79 C.) |
| Ductility at 25 C. (77 F.) (5 cm. per min.), cm | 50 | |
| Total bitumen soluble in carbon disulfide, percent | 72 | 85 |
| Ash, percent | | 0.5 |

NOTE.—

| Ring and Ball Equivalent | | Cube in Water |
|---|---|---|
| 103° F. | = | 120° F. |
| 123° F. | = | 140° F. |
| 137° F. | = | 155° F. |

Another type of standardized coal-tar pitches is the so-called pipeline pitch. These pitches are relatively high softening point pitches, the Barrett specification calling for a ring and ball softening point of 172° F. to 178° F. i.e. about 77° C. to about 81° C. Such pitches, when blended with about 25% of an inert filler such as crushed slate, are useful in coating underground pipes. The so-called pipeline enamels, i.e. pitch plus filler, have somewhat higher softening points, e.g. between about 175° F. and 185° F. (ca. 79° C. to 85° C.) ring and ball, and penetration values at 115° F. of 2 to 9.

The prior art coal-tar pitches, while of great value for the purposes employed, possess a number of deficiencies which reduce their effectiveness or prevent their use in certain applications. Thus the solid pitch coating after application tends to undergo changes in its properties with changes in temperature, i.e. softening at elevated temperatures and embrittlement at lower temperatures. These pitch coatings are therefore said to have a high "temperature susceptibility," i.e. a low resistance to changes in consistency with changing temperatures. In addition to changes with changing temperatures the normal coal-tar pitches tend to suffer degradation with exposure to weathering effects, and especially upon contact with atmospheric oxygen, resulting in hardening and embrittlement of the coating.

A further difficulty experienced in the application of normal coal-tar pitches, for example, in the preparation of built-up roofs and the like, is the tendency of such pitches to chill and harden extremely rapidly when applied in hot, molten condition to a very cold surface, thus adversely affecting the adhesion of the reenforcing felt or granules applied thereto. Similar difficulties are experienced in the application of hot pitches to cold pipe lines, where this rapid chilling prevents uniform application and furthermore causes early embrittlement of the coating, resulting in chipping in the course of handling and shipping the pipe.

A primary object of the present invention, is to provide a process for improving the "temperature susceptibilities" of normal coal-tar pitches.

A further object of the invention is to provide a coal-tar pitch having lower "temperature susceptibilities" than normal coal-tar pitches of otherwise comparable characteristics.

A still further object of the invention is to provide a coal-tar pitch which hardens rapidly to a softening point somewhat below its potential maximum and then gradually hardens to its maximum hardening point, thus providing a longer effective working time for felt application in the case of built-up roofs and the like, and retarding or delaying the embrittlement of the coating.

A still further object of the invention is to provide a coating which develops less brittle tendencies upon aging than do the standard or normal coal-tar pitches.

These and other objects are accomplished according to my invention wherein normal coal-tar pitches are blended with between about 20% and about 80% by weight of an oxidized aromatic flux oil residue as defined hereinafter.

The improved coal-tar pitches of my invention are useful in all applications to which normal coal-tar pitches of comparable physical characteristics are adapted. Thus they are useful in built-up roofing applications, in foundation wall coatings, in general waterproofing applications and in pipeline enamels and the like.

The oxidized aromatic flux oil residue which is a critical component of the new pitches of my invention, is obtained by subjecting a selected coal-tar flux oil to intimate contact with a gas containing elemental oxygen, for example air, at temperatures between about 200° C. and about 500° C. for a time sufficient to produce an oxidized flux oil residue containing at least about 15%, preferably between about 15% and about 45% by weight of benzol-insoluble compounds, usually between about 25% and about 30%, and containing not more than about 5% of quinoline-insolubles. The oxidized aromatic flux oil residue is a pitch-like material having a ring and ball softening point (ASTM D–36) between about 50° C. and about 135° C., preferably between about 60° C. and about 90° C. and a Penetration Index between 0 and −1.5, usually about −0.5. The oxidized product may have a specific gravity, Sp. Gr. 25/25° C., between about 1.20 and about 1.25, usually about 1.22. As noted above, the flux oil after oxidation, no longer is an oil but has substantially the characteristics of a pitch. Blowing the flux oil under the above conditions gives rise to formation of benzol-insoluble compounds which are believed to be responsible for the improved characteristics of reduced temperature susceptibilities in the residues from the blended pitches containing the oxidized aromatic flux oil residue.

The selected flux oils from which the oxidized product is derived, are distillate oils obtained in the distillation of tars resulting from the destructive distillation of bituminous coals. These oils boil above about 250° C. under standard conditions, and usually comprise the so-called light and heavy tar oil fractions, and may also include residues from redistillation of lighter distillates.

Proportions of the oxidized aromatic flux oil residue as defined, up to about 80% by weight based on the weight of the normal pitch/air-blown flux oil blend may be used. I have found that higher proportions of oxidized aromatic flux oil residue tend to cause crystallization of the resulting product when applied to the surface. Even small proportions of the oxidized aromatic flux oil residue added to normal pitches improve the temperature susceptibility of the resulting blend to some extent. However, I usually prefer to use at least about 20% of oxidized aromatic flux oil residue with 80% pitch, percentages between about 25% and about 50% based on the oxidized aromatic flux oil residue/normal pitch blend being preferred.

By suitable selection of proportions of oxidized aromatic flux oil residue to normal coal-tar pitch, resulting blends can be formed which have the desired physical characteristics, particularly softening points, applicable to the particular end use for which they are designed.

The blends of my invention are prepared by heating the pitch components to fluidity in a suitable mixer provided with agitation, and stirring the mixture until uniformly blended, to form a homogeneous blend.

The blends are adapted for application to surfaces in the normal manner, as by hot fluid application to the usually cold surface, whereon the normally solid pitch solidifies by cooling to the solid state. In the blends of my invention initial setting takes place rapidly, but the blend thereafter tends to remain soft for a longer period than do the normal pitches, giving the pitches of my invention the advantage of a somewhat longer period to apply reenforcing materials, such as felt, after mopping in the case of a roofing pitch, or to apply granules within the time in which firm bonding and good adhesion can be obtained.

Alternatively, the blends may be dissolved in a volatile aromatic solvent, such as xylene or high flash naphtha, having a boiling point between about 140° C. and about 250° C., and applied to the surface as a lacquer type coating which hardens or "dries" by evaporation of the solvent. Fillers may be included to form mastics which may be applied by brush, spray or trowel as required.

The improved pitches of my invention may be formulated to have physical characteristics meeting the standard specifications for the various standard pitches as described above, or they may have different characteristics. All of them, however, have temperature susceptibilities less than those of the pitches with which they are blended.

"Temperature susceptibility" as used in the bituminous tar and pitch art, refers to the change in consistency of a solid bituminous composition with temperature changes. Thus, a composition which is hard at low temperature may soften rapidly as temperature is raised, and may harden rapidly as temperature is lowered. Such a composition is said to have a high "temperature susceptibility." A composition with a low temperature susceptibility on the other hand, will not soften as rapidly with rises in temperature and will not harden as rapidly with reduction in temperature. "Consistency" of the composition is measured in the bituminous field by the so-called "needle penetration" test which measures the distance a needle will penetrate into the composition at a given temperature under a particular load in a specified time. Since a bitumen must have a certain degree of softness in order to permit a sufficient penetration of the needle to yield a significant figure, and since softening points of bitumens vary over the range from about 40 (as measured by the ring and ball test) to 135 or higher, needle penetrations must be measured at higher temperatures for the normally harder bitumens than for the softer ones. Thus penetration tests are usually run at one or more of several different temperature levels and loads, depending on the ring and ball softness of the particular bitumen. These are 32° F. or 77° F., with a 100 gram load, 5 seconds for the soft bitumens, 115° F., 50 grams, 5 seconds for the intermediate softness bitumens, and 140° F., 100 grams, 5 seconds for the harder compositions. As a practical matter, most coal-tar pitch compositions are capable of yielding a penetration reading at two of the standard temperature levels named above.

Since the "temperature susceptibility" of a pitch may be rated by a correlation of needle penetration to the softening point of the pitch, there are a number of ways that such correlation can be expressed. Soft pitches, i.e., those having ring and ball softening points between about 40 and about 50, can conveniently be rated by the "penetration index" as defined in the publication entitled "Classifying Asphalts by Means of Penetration Index," by J. Ph. Pfeiffer and P. M. Van Doormal in the February 23, 1938, issue of "National Petroleum News," pages R–78 to R–84.

Another convenient method for rating temperature susceptibility is by computing the ratio of the penetration values at two different temperatures. This correlation is termed the "penetration ratio," and is most often employed in rating pitches having ring and ball softening values above about 50. Needle penetration temperatures used in evaluating pitches of softening points between about 50 and about 65 are 77° F. and 115° F. For pitches with ring and ball softening values above about 65, needle penetration values are conveniently taken at 115° F. and 140° F.

As pointed out above, the new pitch compositions of my invention all have temperature susceptibilities which are substantially lower than that of the normal coal-tar pitch or pitches with which they are blended. Standard roofing pitches usually have penetration ratios above about 10 based on their penetration values at 77° F. and at 115° F. Similar softening point pitches of my invention have penetration ratios below 10, preferably between about 5 and about 9. Standard pipeline enamel pitches, the harder, i.e. higher softening point, pitches, usually have penetration ratios, based on penetrations measured at 115° F. and at 140° F., of 6 or above, whereas those pitches of my invention of comparable softening points have penetration ratios on the same basis appreciably below 6, preferably below about 5.

The properties of the pitch blends of my invention are not necessarily intermediate between those of the two components. In general, small additions of oxidized aromatic flux oil residue tend to depress the softening point of the blend to a value less than that of either of the components. With the addition of successively larger proportions of oxidized aromatic flux oil residue to the normal pitch, a proportion is reached which yields a softening point substantially the same as that of the normal pitch. Thus, if the desired blend is to have the same softening point as the normal coal-tar pitch which forms a component of the blend, the oxidized aromatic flux oil residue must be one that has a softening point higher than that of the normal pitch with which it is to be blended. This is achieved by utilizing an oxidized aromatic flux oil residue having a higher degree of oxidation, i.e. having a relatively higher content of benzene insolubles. By the same token, if it is desired to use an oxidized aromatic flux oil residue of lower softening point, it is necessary only to employ a coal-tar pitch with a softening point higher than that of the desired blend.

The improved pitches of my invention may be used alone, or may be modified by the inclusion of other additives to the pitch binder. For example, the pitch may be used in the preparation of paints by the addition thereto of suitable aromatic solvents as pointed out above. Additives such as fillers, including talc, finely divided stone flour, crushed slate and various grades of asbestos fibre may be employed.

The pitch compositions of my invention can be used as the sole covering for the surface to be protected or they may be combined with known reenforcing agents such as asbestos felt, paper or cloth felt, glass fibre net, "Osnaburg" type cloth, i.e. open weave cotton cloth or tar-saturated cloth.

The pitch compositions of my invention may also be used as a base for other protective coatings such as whitewash, aluminum paint or decorating coatings.

The following examples further illustrate the invention. Parts are by weight except as otherwise noted.

Example 1

The improved lower temperature susceptibiilty of blends of oxidized aromatic flux oil and normal coal-tar pitch as contrasted with the normal coal-tar pitch alone, is illustrated by this example.

A standard roofing pitch of the type normally used for built-up roof construction was blended in varying proportions with oxidized aromatic flux oil residue of the properties set out below, Softening point (R. & B.), ° C. _____ 73.6
Penetration at:
   77° F., 100 g., 5 sec. _____ 8
   115° F., 50 g., 5 sec. _____ 37
Viscosity SSF at 300° F., sec. _____ 220
Benzene insolubles _____ 25.0
Quinoline insolubles _____ 0.6

Softening points and penetration values at two different temperatures were determined for each of the blends. Results are shown in Table II below together with penetration ratios, the latter calculated by dividing the penetration value taken at 115° F. by that taken at 77° F.

TABLE II

| Coal Tar Pitch | Oxidized Residue | Softening Point (Ring and Ball) ° C. | Penetration 77/100/5 | Penetration 115/50/5 | Penetration Ratio |
|---|---|---|---|---|---|
| 100 | 0 | 61.8 | 5 | 87 | 17.4 |
| 90 | 10 | 60.2 | 9 | 103 | 11.5 |
| 80 | 20 | 59.6 | 14 | 117 | 8.4 |
| 70 | 30 | 60.0 | 15 | 110 | 6.7 |
| 50 | 50 | 61.1 | 16 | 95 | 5.9 |
| 0 | 100 | 73.6 | 8 | 37 | 4.6 |

Example 2

A normal waterproofing pitch having a softening point (ring and ball) of 46.5° C. and a penetration index of −1.98 was blended in the proportions of 35 parts by weight of normal pitch and 65 parts by weight of air-blown residue of the same characteristics as that used in Example 1.

The resulting blend had a softening point of 46.8° C. and a penetration index of −0.71 indicating a substantially lower temperature susceptibility than the normal pitch.

The brittle point of the normal pitch was 49° F. whereas that of the blend was 39° F. indicating that the blend will remain flexible at a lower temperature than will the normal pitch. The blend of this example, therefore, has excellent properties for general use in applications for which a pitch of this consistency is desired. Brittle point was determined by Barrett test D-9 for breaking point.

Example 3

The comparative adhesive strength for roofing granules of the pitch composition of my invention and that of a normal roofing pitch was measured as described below.

A blend was made of 70 parts of a normal roofing pitch (Type A, ASTM D-450) and 30 parts of oxidized aromatic flux oil residue having the properties set out in Example 1 above.

The blend had a ring and ball softening point of 60.5 and a penetration ratio of 6.4, based on penetration values taken at 77° F. and at 115° F. as described above.

The normal roofing pitch and the blend were each applied to aluminum panels to form films 0.025 inch thick. Each panel was warmed to about 50° C. and shingle granules were applied to the warm bitumen surface by pouring them on and lightly rolling them in. Loose granules were shaken off and the weight of adherent granules determined. Weights of granules on the two panels were identical. The panels were exposed to atmospheric weathering for a period of eight months, at the end of which time the panels were again weighed to determine percent of granules disbonded and dislodged with the results shown below.

Material:                   Loss of granules, percent
   Normal roofing pitch _____ 26
   Oxidized residue blend _____ 18

Example 4

This example shows the improved (i.e. reduced) temperature susceptibility which results from blending oxidized aromatic flux oil residue in a pipeline enamel. The pipeline enamel was a standard Barrett 180° pipeline enamel and contained 75% normal pipeline coal-tar pitch of ring and ball softening point 172° F.–178° F. and 25% crushed slate filler. A blend was made of 70 parts of standard pipeline enamel with 22.5% oxidized aromatic flux oil residue and 7.5% inert filler to provide a blend of the same filler content as the standard pipeline enamel.

The oxidized aromatic flux oil residue had the properties listed below.

Melting point (C/W), ° C. _____ 85.0
Softening point (ring and ball), ° C. _____ 75.6
Specific gravity at 25/25° C. _____ 1.242
Distillation (C-9), percent by wt.:
   0–300° C. _____ 0.0
   0–355° C. _____ 46.1
   0–360° C. _____ 50.5
Penetration at:
   77/100/5 _____ 7
   115/50/5 _____ 19
Benzol insolubles, percent _____ 26.2
Yield, percent of charge _____ 69

The characteristics of the two pipeline enamels were determined with the results shown below.

|  | Weight Percent | |
| --- | --- | --- |
|  | Normal Pipeline Enamel | Example 4 Blend |
| Normal pipeline pitch | 75 | 52.5 |
| Oxidized Residue | 0 | 22.5 |
| Inert Filler | 25 | 25.0 |
| Softening Point (ring & ball) | 83.5 | 84.0 |
| Penetration 115/50/5 | 11 | 17 |
| Penetration 140/100/5 | 69 | 71 |
| Penetration Ratio at 140/115 | 6.3 | 4.2 |

The lower penetration ratio, i.e. 4.2 of the blended pitch of Example 4, indicates that this composition has a lower temperature susceptibility than normal pipeline enamel of penetration ratio 6.3.

While the above describes the preferred embodiments of the invention, it will be understood that departures may be made therefrom within the scope of the specification and claims.

I claim:

1. An improved coal-tar pitch composition consisting solely of coal-tar derived products, said composition consisting essentially of a homogeneous blend of (1) between about 20% and about 80% by weight of a coal-tar pitch having a ring and ball softening point between about 50° C. and about 80° C. and (2) between about 80% and about 20% by weight of a pitch-like residue obtained by contacting, with an oxygen containing gas at temperatures between about 200° C. and about 500° C., a coal-tar distillate boiling above about 250° C. selected from the group consisting of light and heavy tar oil fractions, and residues from redistillation of lighter distillates, and mixtures thereof, said contacting being continued for a time sufficient to provide a pitch-like residue containing between about 15% and about 45% of benzol insoluble compounds, and not more than about 5% quinoline insolubles; said blend having a ring and ball softening point between about 50° C. and about 90° C. and having a penetration ratio (a) 115/50/5 divided by 77/100/5 of between about 5 and about 10 when the blend has a softening point between about 50° C. and about 75° C.; and (b) having a penetration ratio 140/100/5 divided by 115/100/5 below about 5 when the blend has a softening point between about 75° C. and about 90° C.

2. The composition of claim 1 wherein the oxidized aromatic flux oil residue has a benzene insoluble content between about 25% and about 30% and is present in a proportion between about 25% and about 50%.

3. The composition according to claim 1 wherein the normal coal-tar pitch is a standard pitch of the character specified in ASTM Standard Specification D–450.

4. The composition according to claim 1 wherein the normal coal-tar pitch is a standard pipeline pitch having a ring and ball (ASTM D–36) softening point between about 172° F. and about 178° F.

5. The composition according to claim 4 containing in addition, between about 22% and about 27% of an inert filler.

References Cited by the Examiner

UNITED STATES PATENTS

| 2,395,041 | 2/1946 | Fair | 106—27 XR |
| 2,396,690 | 3/1946 | Fair | 106—280 |
| 2,701,219 | 2/1955 | Fair | 106—280 XR |
| 2,826,507 | 3/1958 | Waddill | 106—284 |
| 3,080,245 | 3/1962 | Barnett et al. | 106—278 |
| 3,173,851 | 3/1965 | King et al. | 208—23 |

ALEXANDER H. BRODMERKEL, *Primary Examiner.*

NORRIS LIEBMAN, J. B. EVANS, *Examiners.*